с

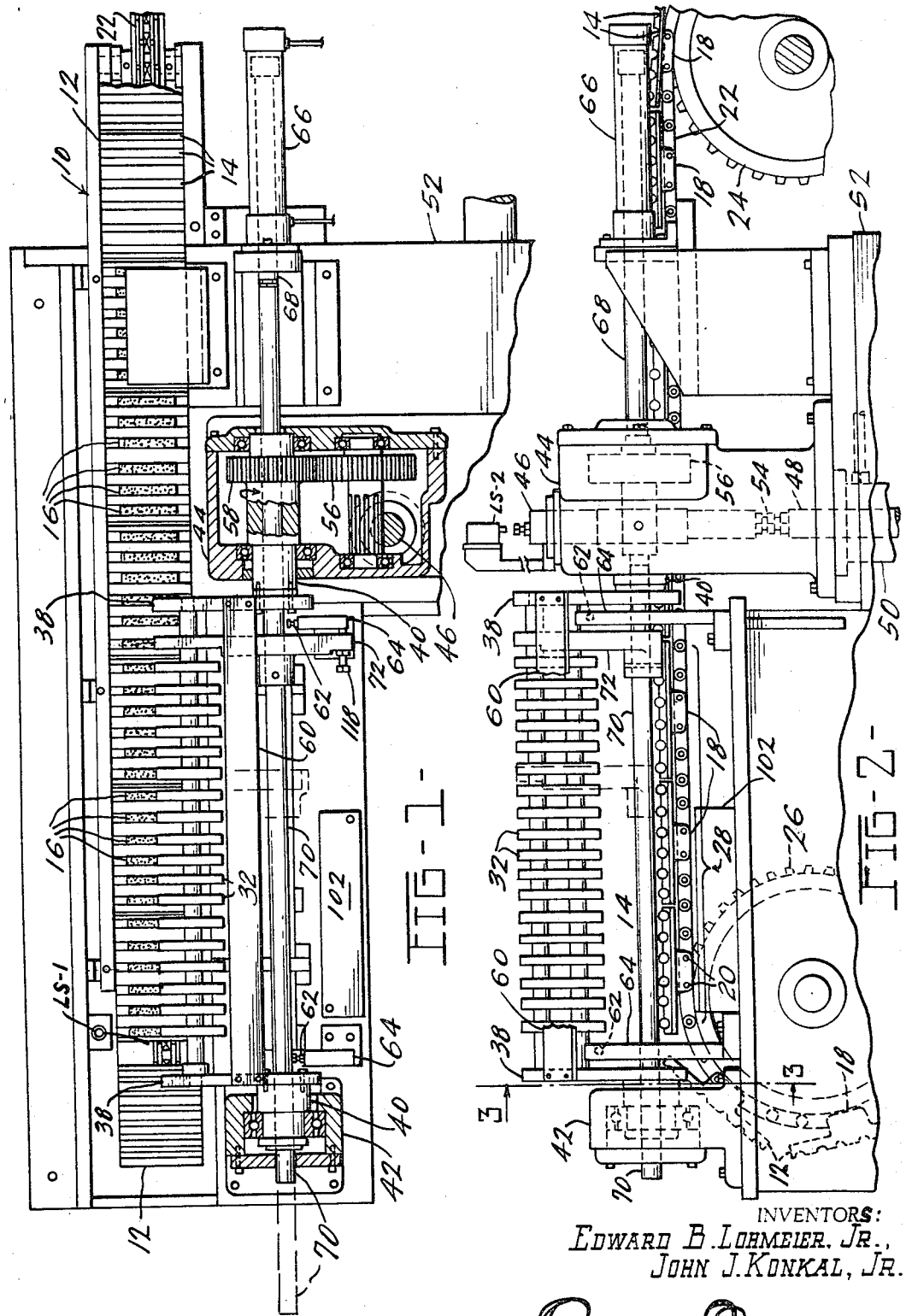

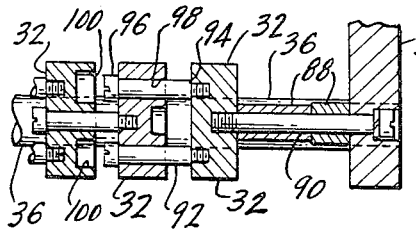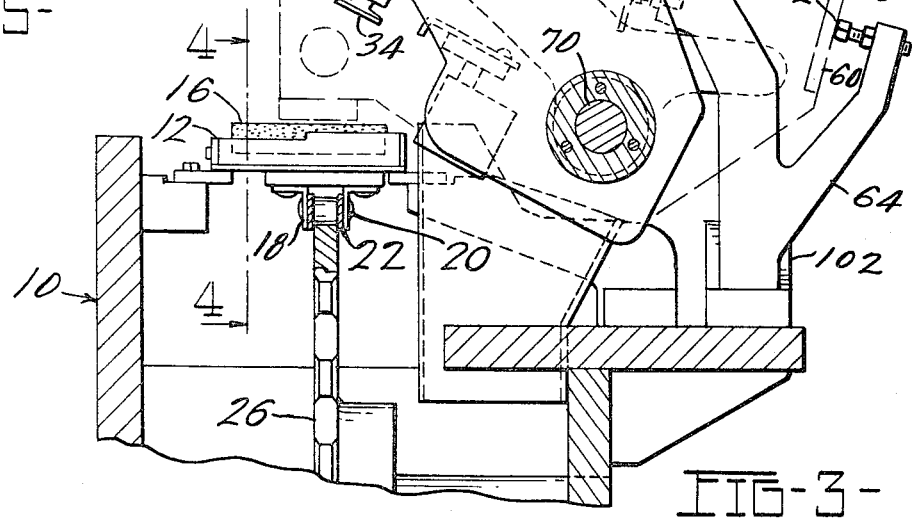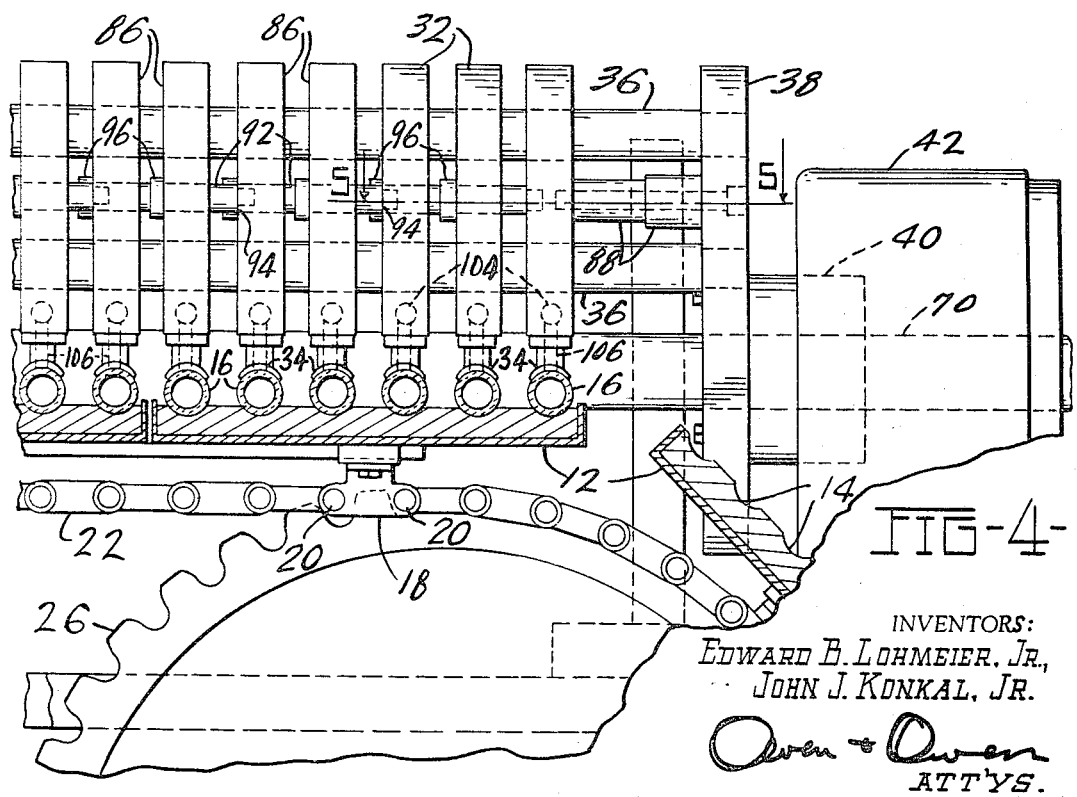

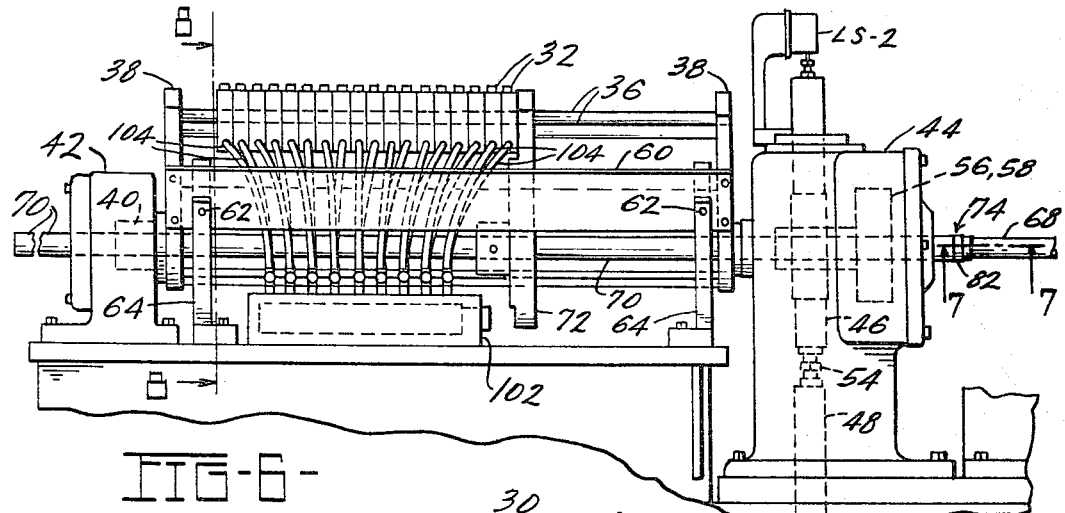
FIG-6-
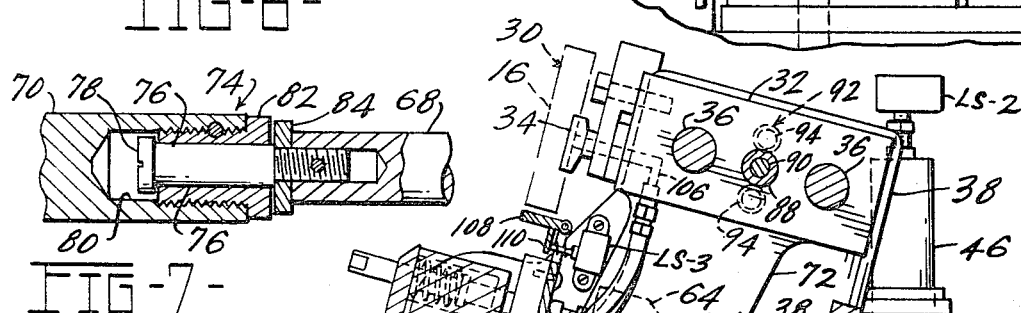
FIG-7-
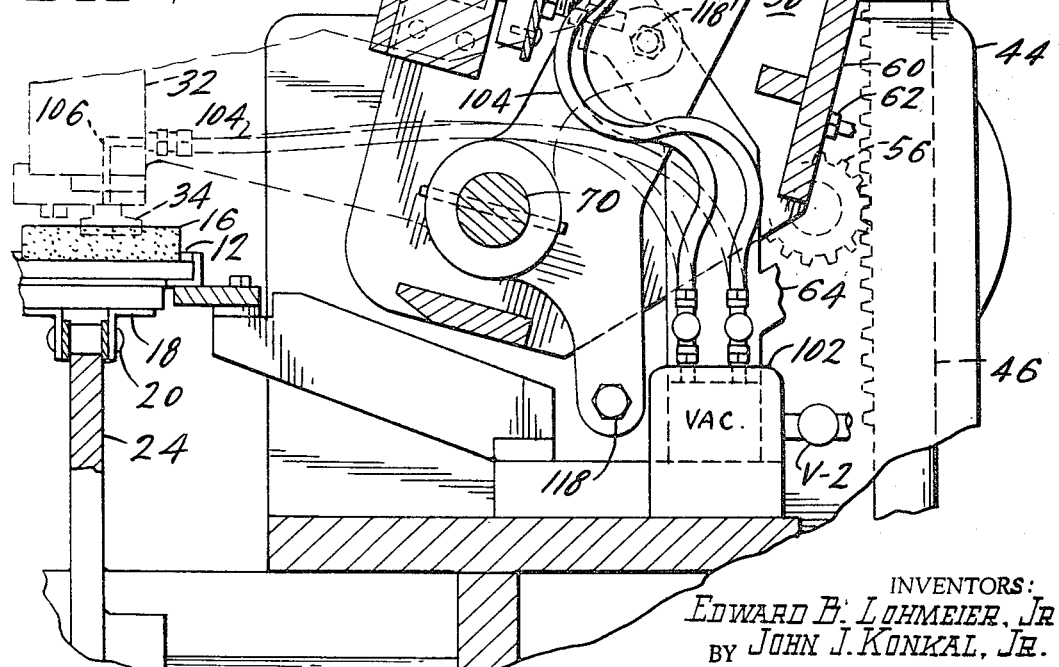
FIG-8-
INVENTORS:
EDWARD B. LOHMEIER, JR.,
BY JOHN J. KONKAL, JR.
Owen + Owen
ATT'YS.

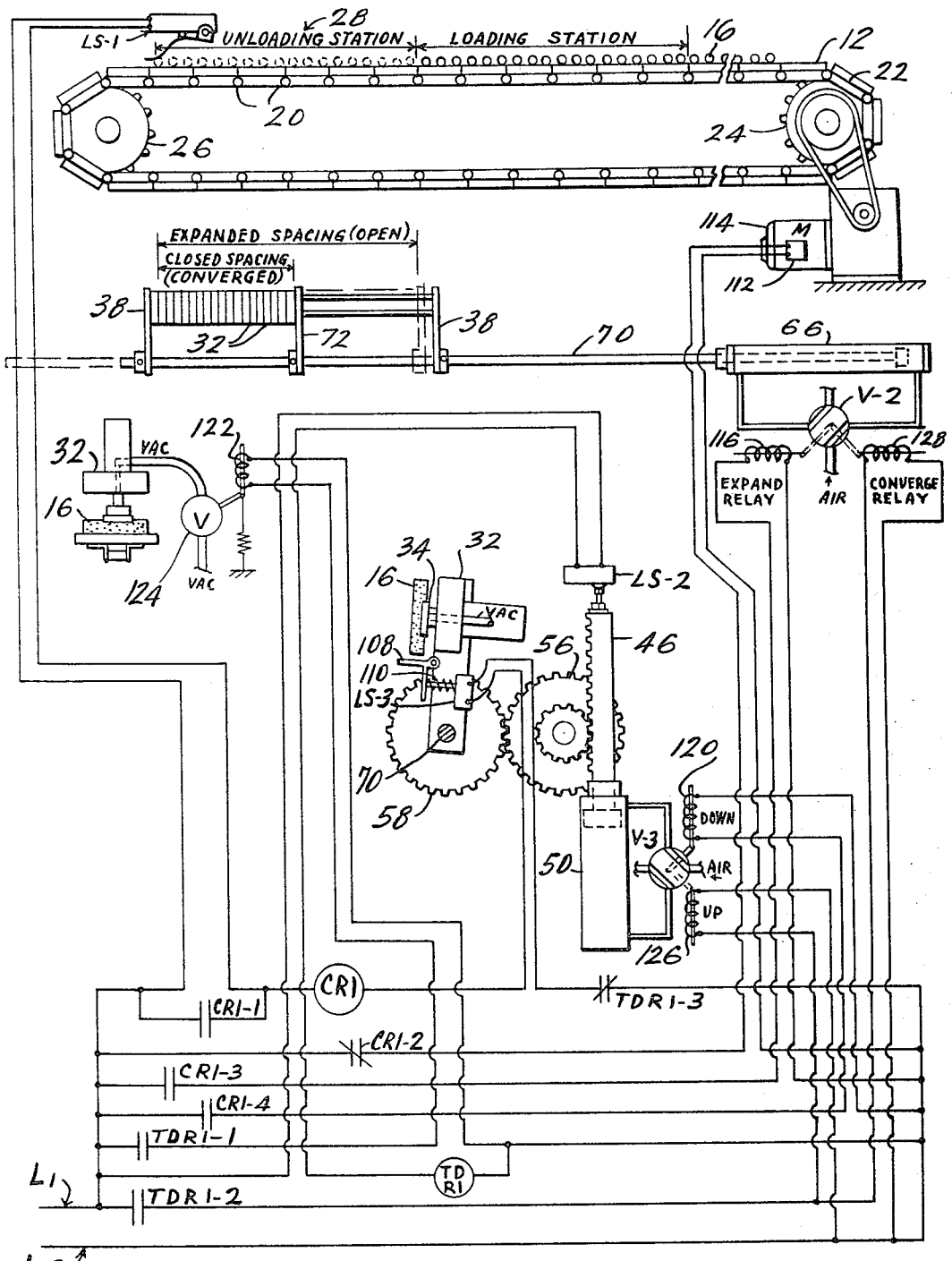

United States Patent Office 3,412,871
Patented Nov. 26, 1968

3,412,871
APPARATUS FOR CHANGING THE SPACING OF A PLURALITY OF CONVEYED ARTICLES
Edward B. Lohmeier, Jr., Fraser, and John J. Konkal, Jr., Bloomfield Hills, Mich., assignors to Champion Spark Plug Company, Toledo, Ohio, a corporation of Delaware
Filed Oct. 21, 1965, Ser. No. 499,711
4 Claims. (Cl. 214—1)

ABSTRACT OF THE DISCLOSURE

An apparatus for changing the spacing of conveyed articles, such apparatus having a plurality of pick-up heads mounted on a frame. The frame rotates on an axle which is parallel to the path of the conveyed articles. The pick-up heads are movable between a first extreme position where they have the spacing of the conveyed articles and a second extreme position where they have the desired spacing. After a conveyed article is positioned under each of the pick-up heads, the conveyor stops, a vacuum cup in each head picks up an individual article and the frame rotates to a work transfer station. The pick-up heads move to the desired spacing, and subsequently the vacuum is released dropping the properly spaced articles onto a platform.

---

The present invention relates to apparatus for changing the spacing between a plurality of articles; and more particularly to a work transfer device for removing articles from a conveyor and transferring the articles to another location while at the same time changing the spacing between the articles.

Many types of material handling situations exist where it is convenient to transport articles at one spacing and perform conditioning operations such as heating, cooling, etc. on the articles when such articles are spaced differently from each other. Such a condition exists when ceramic bodies are placed in trays for firing in kilns. In one application of the apparatus of the present invention, ceramic bodies are moved from a spaced-apart arrangement on a conveyor to direct engagement with each other so that they will stand erect in trays for firing in a kiln. Many other applications exist, however, in which it is necessary to change the spacing of workpieces, and it is contemplated that the present invention can be used in many of these instances.

An object of the present invention is the provision of a new and improved apparatus of the above-mentioned type which is simple in design, rugged in construction and efficient in operation.

Another object of the present invention is the provision of new and improved apparatus for unloading a conveyor and which automatically changes the spacing between the articles as the articles are transferred from the conveyor to a work transfer station.

Another object of the invention is the provision of a new and improved apparatus of the above-described type which transfers the articles to a standing position free and clear of the transfer mechanism for subsequent removal from the transfer station by other mechanism.

The invention resides in certain constructions, combinations and arrangements of parts; and further objects and advantages will become apparent to those skilled in the art to which it relates from the following description of the preferred embodiment described with reference to the accompanying drawings forming a part of this specification, and in which:

FIG. 1 is a fragmentary plan view of a machine embodying the present invention;

FIG. 2 is an elevational view of the portion of the machine shown in FIG. 1, the view having portions broken away to better illustrate the work supporting and converging structure;

FIG. 3 is an end view taken approximately from a position indicated by the line 3—3 of FIG. 2;

FIG. 4 is an enlarged sectional view taken from a position indicated by the line 4—4 of FIG. 3;

FIG. 5 is a fragmentary sectional view taken along the line 5—5 of FIG. 4;

FIG. 6 is a fragmentary side elevational view similar to FIG. 2 but including the portions deleted in FIG. 2;

FIG. 7 is a fragmentary sectional view taken along the line 7—7 of FIG. 6;

FIG. 8 is an enlarged fragmentary sectional view taken from a position indicated by the line 8—8 of FIG. 6; and FIG. 9 is a diagrammatic view of the control mechanisms and the attendant structure of the apparatus shown in FIGS. 1 to 8.

Although the invention will have general utility for changing the spacing between a plurality of articles and can be used to accomplish this while transferring workpieces from any type of conveying mechanism to a transfer station, it has particular advantages for simultaneously unloading articles from trays carried by a conveyor, and for simultaneously changing the spacing of the articles.

The conveyor mechanism 10 shown in the drawings comprises a plurality of trays 12 which have six transverse recesses 14 in their upper surface. The recesses 14 are spaced apart by a predetermined distance and are adapted to receive individual ones of a plurality of generally tubular workpieces 16. The trays 12, as best seen in FIG. 4, have a depending bracket 18 affixed thereto and which, in turn, is secured to an adjacent pair of transverse pins 20 of an endless link conveyor 22. The link conveyor 22 extends between a driven tail sprocket 24 and a head sprocket 26 positioned forwardly of an unloading station generally indicated by the bracket 28. The conveyor mechanism 10 is loaded with the workpieces 16 at a position adjacent the tail sprocket 24. The loading mechanism is not shown since the manner in which the conveyor is loaded is unimportant relative to the present invention.

The apparatus about to be described is adapted and arranged to remove the workpieces 16 at the spacing provided by the grooves 14 in the trays 12 and move them to a work transfer station, or position 30 indicated by the dotted lines in FIG. 8. During the transfer of the workpieces from the conveyor to the work transfer station the mechanism automatically changes the spacing of the workpieces 16 to one differing from that of the recesses 14, and which in the present instance places the workpieces in standing abutment. The specific embodiment of apparatus shown and described can, therefore, be thought of as a converging mechanism.

Various means can be used for picking up and supporting the workpieces 16 as they are moved from the unloading station 28 to the work transfer station 30. In the embodiment shown in the drawings, a plurality of article pick-up heads 32, one for each of the articles transferred are provided. Each of the pick-up heads 32 carries a vacuum cup 34 for engaging and holding the individual workpieces. The pick-up heads 32 must be supported in a manner which permits the heads to be moved toward and away from each other, and in the embodiment shown in the drawing, the heads are slidably supported on two longitudinally extending rods 36 which are generally parallel to the workpieces 16 when supported in the trays 12 at the unloading station 28. The rods 36 are, in turn, affixed to opposite brackets or arms 38. The arms 38 are secured to respective ones of a pair of bushings 40 which are aligned on an axis parallel to the rods 36 and which are suitably journaled in the head-post 42 and the tail-post 44, respectively. The arms 38 and longitudinally extending rods 36 form a frame which carries the pick-up heads 32, and causes them to rotate from the unloading station 28 to the work transfer station 30.

Rotation of the frame is produced by gearing journaled in the tail-post 44 and which is driven by a vertically extending rack 46 driven by a piston rod 48 of an air cylinder 50 that is located in the base of the housing 52 of the machine. A suitable adjustable connection 54 is provided between the piston rod 48 and rack 46, and the rack 46 drives a cluster gear 56 that, in turn, meshes with a spur gear 58 which is either securely fastened to or is integral with the bushing 40 that is journaled in the tail-post 44. Upward movement of the rack 46 rotates the spur gear 58 through the cluster gear 56 in a manner causing the frame to rotate the pick-up heads 32 from a pick-up position adjacent the conveyor 10 to the work transfer station 30. This rotating movement of the frame is limited by engagement of a transverse bracket 60 that extends between the arms 38, with a pair of adjustable stops 62 carried by a pair of uprights 64.

As previously indicated, the spacing of the workpieces 16 is changed simultaneously with the transfer of the workpieces from the unloading station 28 to the transfer station 30. The spacing of the pick-up heads 32 and hence the workpieces 16 is reduced by a horizontal air cylinder 66 having a piston rod 68 that, in turn, is connected to an axially movable thrust rod 70. The thrust rod 70 extends through the spur gear 58 and bushings 40, and is affixed to a bracket 72 arranged to slide along the rods 36 to vary the spacing of the pick-up heads 32. The rod 70 is slidably supported and journaled in the bushings 40 and projects outwardly of the tail-post 42 for free axial movement with respect to the supporting and rotating structure for the heads 32.

Inasmuch as the bracket 72 slides along and closely engages the rods 36, the thrust rod 70 must rotate with the frame structure carrying the pick-up heads 32. To obviate rotation of the piston rod 68, a swivel connection 74 (FIG. 7) is provided between the thrust rod 70 and the piston rod 68. Swivel connection 74 comprises a headed pin 76 that is threaded into the piston rod 68, and the head 78 of which is received in an axially extending bore 80 in the end of the thrust rod 70. An annular bushing 82 and thrust washer 84 are positioned over the shank of the headed pin 76 in that order, and the headed pin 76 is threaded into the piston rod 68 until just proper clearance for rotation remains between the head 78 of the pin and the bushing 82 and between the bushing 82 and thrust washer 84. A hole is drilled through the piston rod and pin 76, and a lock pin installed to lock the two together. The bushing 82 is threaded tightly into the thrust rod 70. A hole is then drilled through these parts and a pin installed to lock these parts together.

In the machine shown in the drawings, the distance between the workpieces 16 is reduced during the transfer of the workpieces from the conveyor to the transfer station. This reduction or converging of the workpieces is accurately and simply accomplished by the sequential movement of the heads 32 into abutment with each other. Bracket 72, as previously described, is moved by the air cylinder 66 and thrust rod 70, and the pick-up heads 32 are provided with accurately spaced apart abutment surfaces 86 on their opposite sides. Movement of the bracket 72 towards the head post 42, therefore, sequentially moves the pick-up heads 32 into engagement with each other to automatically provide the desired spacing at the work transfer station 30. The bracket 72 is securely fastened to the adjacent pick-up head 32 by means of annular spacers 88 and a hold-down stud 90 which passes therethrough. This structure is best seen in FIG. 5, where a pickup head 32 is similarly spaced from and securely fastened to arm 38.

Separation of the pick-up heads from the spacing used at the work transfer station to that of the work supporting recesses of the conveyor 10 is produced by the retraction of the piston rod 68 of the air cylinder 66 and the endwise movement of the bracket 72. As previously stated the bracket 72 is affixed to the adjacent pick-up head 32, and the movement of the adjacent pick-up head 32 is transferred sequentially to each of the other pick-up heads by accurately machined stops or abutments 92. The stops 92 shown in FIGURE 5 are studs having shoulders 94 accurately positioned relative to their heads 96. The studs 92 extend through a suitable opening 98 in one pick-up head and are threaded into an adjacent pick-up head 32. The opening 98 provides sliding clearance with the stud 92, and by reason of the fact that the opposite sides 86 of each head 32 are at a predetermined distance apart, engagement of a head 96 with a side surface of a head 32 automatically spaces the abutting head relative to the adjacent head 32 to which the stud 92 is connected. Alternate connections between heads are made by a pair of studs 92 respective members of which are positioned on opposite sides of the line of force of hold-down stud 90, and the remainder of the connections are made by single studs 92 positioned on the line of force of the hold-down stud 90. All of the studs 92 are in a plane centered between the support rods 36 so that all "cocking action" on the rods 36 is eliminated. A suitable recess 100 is provided in the surface of a pick-up head 32 opposite the end of a stud 92 to receive the head 96 of the stud when the pick-up heads 32 are converged. In the embodiment shown in the drawings, the studs which are fastened to every third pick-up head 32 are aligned, and the openings into which the studs 92 are threaded are counterbored adjacent their opposite ends to provide the recess 100.

While any suitable means can be provided on each of the pick-up heads 32 for picking up and supporting the workpieces 16, this function is accomplished in the embodiment shown in the drawings by vacuum cups 34 to which vacuum is supplied by the vacuum header 102 best seen in FIG. 8. Respective flexible hoses 104 extend between the vacuum header 102 and each of the pick-up heads 32 and a suitable passageway 106 communicates the vacuum through the head to its vacuum cup 34.

In the normal condition of the apparatus shown in the drawings, the pick-up heads 32 will be at the work transfer station 30 and the rack 46 will be in its upper position as shown in FIG. 8. The vacuum is released and the workpieces 16 stand upon a platform 108 carried by the arms 38 of the work transfer frame. The projecting sides of each vacuum cup 34 will engage opposite sides of a workpiece 16 resting thereon to prevent the workpiece from falling sidewise even though no vacuum exists in the vacuum cup. The platform 108 in the present instance is hinged adjacent its upper surface, and the weight of workpieces 16 thereon will cause the platform to exert a force which overcomes a spring 110 to actuate the limit switch LS3 and open its normally closed contacts. Limit switch LS3, therefore, senses when workpieces are supported on the platform.

Operation of the apparatus shown in the drawings will now be described with reference to the control diagram of FIG. 9. When the first of a series of workpieces 16 carried by the conveyor 10 reaches an end position corresponding with the end pick-up head 32 adjacent the head post 42, it engages the actuating arm of limit switch LS1 to close an electrical circuit between electrical supply lines L1 and L2 through control relay CR1 and limit switch LS3. If the workpieces 16 have been removed from the platform 108, LS3 is closed and relay CR1 is now actuated to cause its normally open contact CR1–1 to close and thereby establish a holding circuit about the limit switch LS1. Actuation of CR1 opens its normally closed contact CR1–2 which is in series with the starter 112 of the conveyor drive motor 114 to immediately stop the conveyor. Actuation of the relay CR1 also closes its contact CR1–3 which completes an electrical circuit through solenoid 116 to supply air to the top side of the piston in the air cylinder 66. This forces the thrust rod 70 through the bushings 40 in the head and tail posts 42 and 44, respectively and moves the bracket 72 toward the tail post 44. Movement of the bracket 72, in turn, moves the head 32 to which it is fastened, to in turn, move the studs 92 fastened thereto until their heads 96 engage the adjacent pick-up head 32 twice removed from the bracket 72. Movement of the pick-up head 32 twice removed, in turn, actuates the succeeding head 32, and this operation is repeated until the abutment 118 engages the upright 64 to provide the same spacing which the workpieces have on the conveyor. Simultaneously with this diverging movement of the pick-up heads 32, the heads 32 are rotated towards the conveyor.

Actuation of the relay CR1 also closes its contact CR1–4 which establishes an electrical circuit through the solenoid 120 to put air on the top side of the piston of the air cylinder 50 to move the rack 46 downwardly. Downward movement of the piston of air cylinder 50 causes the pick-up heads 32 to move to their loading position above the conveyor. When the frame carrying the pick-up heads 32 starts downwardly, the rack 46 moves away from limit switch LS2 and its contacts closed. LS2 is in series with time delay relay TDR1 which then becomes actutaed. After several seconds during which time the pick-up heads 32 have moved downwardly, TDR1 trips to close its contact TDR1–1 to energize solenoid 122 and supply vacuum to the pick-up heads 32 to pick up the workpieces 16. Simultaneously therewith contact TDR1–2 is closed to complete an electrical circuit through solenoid 126 to reverse valve V–3 and remove air pressure from the top end of the piston of air cylinder 50 and supply air pressure to the bottom side of the piston in air cylinder 50. This raises the rack 46 and causes the frame carrying the heads to rotate towards the transfer position. Simultaneously therewith the closing of the contact TDR1–2 also completes an electrical circuit through solenoid 128 which reverses valve V–2 to remove air pressure from the top side of the piston in the air cylinder 66 and supply air pressure to the top side of the piston in the air cylinder 66. This causes the pick-up heads 32 to converge during the time that they are being rotated from the conveyor to the work transfer station so that both movements are accomplished simultaneously. When time delay relay TDR1 trips it also opens contacts TDR1–3 which are in series with control relay CR1 to de-energize the relay and start the conveyor. When the frame carrying the pick-up heads 32 reaches the work transfer station, timer TDR1 runs out to open contacts TDR1–1 and TDR1–2 to allow valve 124 to shut off vacuum to the heads 32 and allow the workpieces 16 to drop down onto the platform 108 to close limit switch LS–3. Contacts TDR1–3 are simultaneously closed to allow CR1 to be recycled.

It will be apparent that the objects heretofore enumerated, as well as others, have been accomplished, and that there has been provided apparatus which will not only accurately change the spacing of workpieces but which will simultaneously and automatically transfer the workpieces from a conveyor or other similar device to a work transfer station.

While the invention has been described in considerable detail, we do not wish to be limited to the particular embodiment shown and described, and it is my intention to cover hereby all novel adaptations, modifications and arrangements thereof which come within the practice of those skilled in the art to which the invention relates.

We claim:

1. Apparatus for changing the spacing of a plurality of frangible articles, each of such articles having opposed first and second ends, said apparatus comprising: a horizontal conveyor on which such articles are positioned with their longitudinal axes perpendicular to the direction of movement of said conveyor and spaced at predetermined intervals, such articles being positioned on said conveyor with such first and second ends lying in a generally horizontal plane, a plurality or article pick-up heads, a frame supporting said pick-up heads for movement toward and way from each other in such direction, said frame being rotatable relative to said conveyor on an axis generally parallel to such direction of movement of said conveyor, means for rotating said frame from a pick-up position wherein said heads will engage such horizontally disposed articles on said conveyor to a generally vertical rotated position wherein said articles are clear of said conveyor, such first ends of the rotated articles lying in a common, generally horizontal, plane when said frame is in such rotated position, means independent of said rotating means for moving said heads in such direction of movement of said conveyor on said frame to change the spacing of such articles carried by said heads between the spacing on the conveyor and another spacing at such rotated position, first circuit means for stopping said conveyor when an article is under each of said pick-up heads and for causing said pick-up heads to pick up the articles, second circuit means operable after said first circuit means for causing said rotating means and said head moving means to operate, and third circuit means operable after said second circuit means for causing said pick-up heads to release the articles.

2. Apparatus for changing the spacing of a plurality of frangible articles, each of such articles having a generally cylindrical shape and opposed first and second ends, said apparatus comprising: a horizontal conveyor on which such articles are positioned with their longitudinal axes perpendicular to the direction of movement of said conveyor and spaced at predetermined intervals, such articles being positioned on said conveyor with such first and second ends lying in a generally horizontal plane, a plurality of article pick-up heads, vacuum means operable after such articles are located under said pickup heads for causing said pick-up heads to pick up such articles, a frame supporting said pick-up heads for movement toward and away from each other in such direction, said frame being rotatable relative to said conveyor on an axis generally parallel to such direction of movement of said conveyor, means for rotating said frame from a pick-up position wherein said heads will engage such horizontally disposed articles on said conveyor to a generally vertical rotated position, a platform beneath such rotated position of said heads and on which such first ends of such articles can rest, means independent of said rotating means for moving said heads in such direction of movement of said conveyor on said frame to change the spacing of articles carried by said heads between the spacing on the conveyor and another spacing at such rotated position, means for releasing such articles from said pick-up heads when in such rotated position to position such articles on said platform, and means operable after said articles are removed from said platform for causing said pick-up heads to return to such pick-up position.

3. Apparatus for changing the spacing of a plurality of frangible articles, each of such articles having a generally tubular configuration and opposed first and second ends, said apparatus comprising: a horizontal conveyor on which such articles are positioned with their longitudinal axes perpendicular to the direction of movement of said conveyor and spaced at predetermined intervals, such articles being positioned on said conveyor with such first and second ends lying in a generally horizontal plane, a plurality of article pick-up heads, a frame supporting said pick-up heads for movement toward and away from each other in such direction, said frame being rotatable relative to said conveyor on an axis generally parallel to such direction of movement of said conveyor, means for rotating said frame from a pick-up position wherein said heads will engage such horizontally disposed articles on said conveyor to a generally vertical rotated position wherein said articles are clear of said conveyor, such first ends of the rotated articles lying in a common, generally horizontal, plane when said frame is in such rotated position, means for moving said heads in such direction of movement of said conveyor on said frame to change the spacing of articles carried by said heads between the spacing on the conveyor and another spacing at such rotated position, and means for rotating said frame from such pick-up position wherein said heads will engage articles on said conveyor to such rotated position free and clear of said conveyor.

4. Apparatus for changing the spacing of a plurality of frangible articles, each of such articles having a generally tubular configuration and opposed first and second ends, said apparatus comprising: a horizontal conveyor on which such articles are positioned with their longitudinal axes perpendicular to the direction of movement of said conveyor and spaced at predetermined intervals, such articles being positioned on said conveyor with such first and second ends lying in a generally horizontal plane, a plurality of article pick-up heads, vacuum cups on said pick-up heads for holding articles, a frame supporting said pick-up heads for movement toward and away from each other in such direction, each of said heads having a stop for abutment with an adjacent head to limit separation of said heads to the spacing of said articles on said conveyor, said frame being rotatable relative to said conveyor on an axis generally parallel to such direction, means for rotating said frame from a pick-up position wherein said heads will engage such horizontally disposed articles on said conveyor to a generally vertical rotated position, a generally horizontal platform beneath said rotated position of said heads and on which such first ends of such articles can rest, means for supplying vacuum to said vacuum cups when in such pick-up position and for releasing vacuum in said cups when said head is in such rotated position to allow such articles to settle on said platform, and means independent of said rotating means for moving one end head in such direction toward the other heads to decrease the spacing of articles carried by said heads between the spacing on the conveyor and another spacing at such rotated position, whereby each article at such rotated position is positioned a predetermined distance from an adjacent article.

References Cited
UNITED STATES PATENTS

| | | |
|---|---|---|
| 1,601,868 | 10/1926 | Luce. |
| 3,168,204 | 2/1965 | Voullaire _____ 214—6 |
| 3,235,057 | 2/1966 | Rea et al. _____ 214—1 |
| 3,302,967 | 2/1967 | Harris et al. _____ 294—65 |

GERALD M. FORLENZA, *Primary Examiner.*

F. E. WERNER, *Assistant Examiner.*